United States Patent [19]

Pan

[11] Patent Number: 5,689,595
[45] Date of Patent: Nov. 18, 1997

[54] RARE EARTH-DOPED FIBER AMPLIFIER ASSEMBLIES FOR FIBEROPTIC NETWORKS

[75] Inventor: J. J. Pan, Milpitas, Calif.

[73] Assignee: E-Tek Dynamics, Inc., San Jose, Calif.

[21] Appl. No.: 587,427

[22] Filed: Jan. 17, 1996

[51] Int. Cl.[6] .................. G02B 6/26; H01S 3/00; H01S 3/30
[52] U.S. Cl. .................. 385/27; 385/11; 385/15; 385/30; 385/31; 385/33; 385/46; 385/47; 359/333; 359/341; 359/345; 372/6
[58] Field of Search ............... 385/11, 16, 17, 385/18, 24, 27, 30, 31, 33, 34, 39, 42, 46, 47, 123; 359/333, 341, 342, 345, 346; 372/6

[56] References Cited

U.S. PATENT DOCUMENTS

| | | | |
|---|---|---|---|
| 5,280,549 | 1/1994 | Barnard et al. | 385/15 |
| 5,303,314 | 4/1994 | Duling, III et al. | 385/11 |
| 5,481,391 | 1/1996 | Giles | 359/179 |
| 5,532,864 | 7/1996 | Alexander et al. | 359/177 |
| 5,563,733 | 10/1996 | Mitsuda et al. | 359/341 |

*Primary Examiner*—Brian Healy
*Attorney, Agent, or Firm*—Townsend and Townsend and Crew LLP

[57] ABSTRACT

Assemblies having a first optical circulator, a pumping laser, a rare-earth doped fiber and a first coupler are described. The first coupler has a first fiber connected to the optical circulator, a second fiber connected to said pumping laser, and a third fiber connected to one end of the rare-earth doped fiber which is operated as a fiber amplifier. The coupler blocks the pumping laser light from the first fiber and reflects the light into the third fiber. The coupler further transmits the input signals from the first fiber into the third fiber. This arrangement allows the rare-earth doped fiber to amplify the input signals from the energy of the pumping laser light. By changing the elements connected to the second end of the rare-earth doped fiber, optical fiber amplifier assemblies in which the message signals are amplified by passing through the rare-earth doped fiber twice, by pumping the rare-earth doped fiber with two pumping lasers, or both, are provided for.

23 Claims, 3 Drawing Sheets

RARE EARTH-DOPED FIBER AMPLIFIER ASSEMBLIES FOR FIBEROPTIC NETWORKS

BACKGROUND OF THE INVENTION

The present invention relates to fiberoptic networks and, more particularly, to optical amplifier devices.

Optical amplifiers are used in fiberoptic networks to maintain the strength of optical signals from the initial source to the ultimate receiver(s). In present fiberoptic networks, rare-earth doped fibers are often used as the amplifier elements in an optical amplifier assembly supplying the gain to the input signal.

In some fiberoptic networks, the optical signals travel in only one direction on a network fiber. For such networks, two fibers with two sets of optical amplifiers are thus required for two-way communication. To reduce the number of fibers and components and, therefore, the costs of the networks, it is desirable that the networks be bidirectional. Of course, the fiber optic amplifiers in the networks must also be bidirectional.

The present invention provides for an improved fiber optic amplifier assembly, which is low in cost and high in performance. In some embodiments of the present invention, the assembly is also suitable for bidirectional networks.

SUMMARY OF THE INVENTION

The present invention provides for an optical fiber amplifier assembly having a first optical circulator, a pumping laser, a rare-earth doped fiber and a first coupler. The first optical circulator has a first port and a second port. The optical circulator transmits input signals received at the first port to the second port. The pumping laser generates light at a wavelength different from those of the input signals. The first coupler has a first fiber connected to the second port of the first optical circulator, a second fiber connected to said pumping laser, and a third fiber connected to the rare-earth doped fiber which is operated as a fiber. The coupler blocks the pumping laser light from the first fiber and reflects the light into the third fiber. The coupler further transmits the input signals from the first fiber into the third fiber. This arrangement allows the rare-earth doped fiber to amplify the input signals from the energy of the pumping laser light.

The opposite end of the rare-earth doped fiber can be connected to a second optical circulator for bidirectional traffic through the optical fiber amplifier assembly. Rather than an optical circulator, a collimating lens with a reflector may also be connected to the opposite end of the rare-earth doped fiber. In this variation of an optical fiber amplifier assembly, the message signals are amplified twice since they pass twice through the rare-earth doped fiber. This variation is suitable for unidirectional networks.

In another embodiment of the present invention, a second pumping laser is connected between the collimating lens with the reflector and the rare-earth doped fiber. This arrangement supplies the rare-earth fiber amplifier with more energy. This double-pass, double-pump assembly is suitable for unidirectional networks.

Finally, a fully bidirectional, double-pump assembly is created by connecting a second coupler, a second pumping laser, and a second optical circulator. The second coupler has a first fiber connected to the second port of the second optical circulator, a second fiber connected to the second pumping laser, and a third fiber connected to the rare-earth doped fiber. The second coupler blocks the second pumping laser light from the first fiber and reflects the light into the third fiber and the rare-earth doped fiber. In one direction the coupler further transmits signals from the third fiber and the rare-earth doped fiber amplifier into the first fiber and the second optical circulator, and in the reverse direction transmits signals from the first fiber and the second optical isolator into the third fiber and the rare-earth doped fiber.

DETAILED DESCRIPTION OF PREFERRED EMBODIMENT(S)

Figure 1:
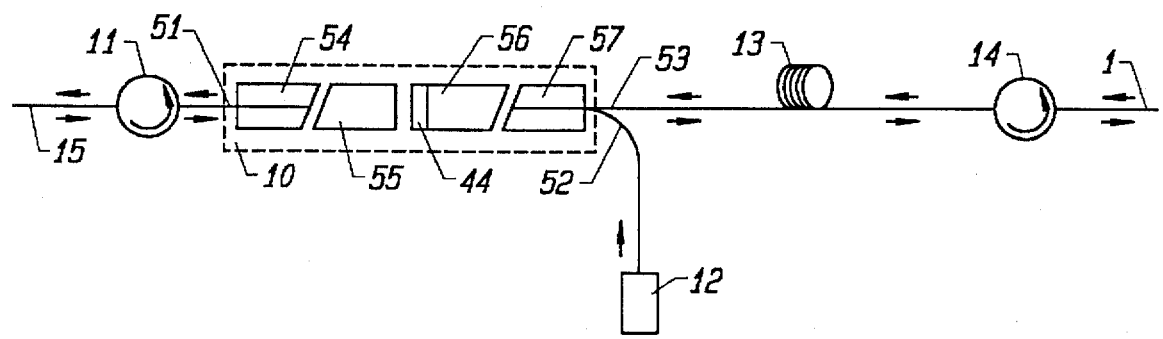
FIG. 1 is a diagram of a bidirectional optical fiber amplifier assembly according to one embodiment of the present invention.

In the following description of the various embodiments of the present invention, it should be noted that the same reference numerals are used in the drawings where the referenced element has the same function or operation to further aid an understanding of the present invention.

FIG. 1 illustrates one embodiment of an optical fiber amplifier assembly according to the present invention. The assembly has a optical circulator 11 which has two ports. (Typically, an optical circulator has three ports. The circulator can be effectively changed into a two-port circulator by placing a reflector at one of the ports so that light from the port is reflected back into the port.) One port is connected to an optical fiber 15 which carries fiberoptic network light signals. The second port is connected to one optical fiber section 51 of a WDM (Wavelength Division Multiplexing) coupler 10. The coupler 10 has two additional fiber sections 52 and 53, one of which is connected to a pumping laser 12 and the other connected to one end of a rare-earth doped fiber 13 which operates as a fiber amplifier in the assembly. The other end of the doped fiber 13 is connected to a second optical circulator 14. The circulator 14 is also connected to an optical fiber 16.

Incoming signals from the fiber 15 are passed from the first port of the circulator 11 to its second port. The signals then pass through the coupler 10 to the fiber amplifier 13. At the same time, the coupler 10 receives light energy from the pumping laser 12 over the fiber section 52. The coupler 10 reflects the light energy from the laser 12 back through the section 53 to the rare-earth doped fiber 13. From the energy supplied by the pumping laser 12, the doped fiber 13 amplifies the signals and passes the amplified signals to a second port of the circulator 14. The circulator 14 then passes the amplified signals to its first port and the fiber 16. Thus signals passing from the optical fiber 14 to the fiber 16 undergoes a gain in signal strength.

Furthermore, the described optical fiber amplifier assembly is bidirectional. Incoming signals to the first port of the optical circulator 14 are passed through its second port to the rare-earth doped fiber 13 which amplifies these signals in the reverse direction. The signals pass through the coupler 10 and are received by the second port of the optical circulator 11. The circulator 11 passes these signals through its first port to the optical fiber 15.

The structure and operation of optical circulators and rare-earth doped fiber amplifiers are well-known. The structure of the coupler 10 may be less evident and is described below.

Figure 2:
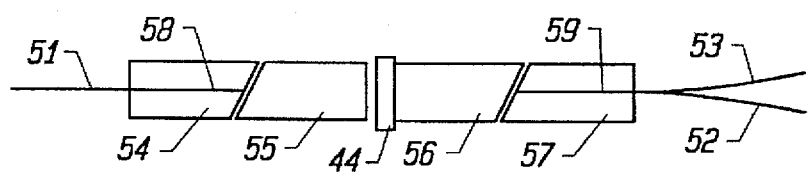
FIG. 2 is a diagram of the coupler in the bidirectional optical fiber amplifier of FIG. 1.

FIG. 2 is a cross-sectional view of the WDM coupler 10, which has a glass sleeve 54, a quarter-pitch GRIN (GRaded INdex) lens 55, a long-pass filter 44, a second quarter pitch GRIN lens 56 and a second glass sleeve. Selfoc® lenses from Nippon Sheet Glass Co. of Tokyo, Japan are used for the GRIN lenses 55 and 56. The fiber end section 51 is held in an opening 58 through the longitudinal axis of the glass sleeve 54. Similarly, the fiber end sections 52 and 53 are held in an opening 59 through the longitudinal axis of the second glass sleeve 57. The sleeve 54 has a slant-angled face which is in close proximity with a reciprocally slanted face of the GRIN lens 55. Similarly the sleeve 57 has a slant-angled face which is close proximity with a reciprocally slanted face of the GRIN lens 56.

Figure 3:
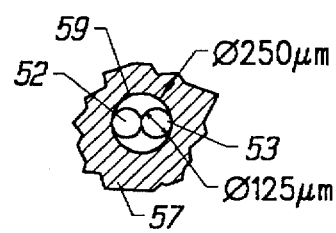
FIG. 3 is a detailed end view of the sleeve holding two optical fibers in the coupler of FIG. 2.

The fiber end sections 51, 52 and 53 are formed by unjacketed optical fibers. The core and cladding of each fiber are exposed, and the exposed cladding and core may or may not be tapered. FIG. 3 is a detailed cross-sectional end view of the opening 59 in the sleeve 57. In this example, the end sections 52 and 53 are untapered. Hence the cross-sectional diameter of each fiber is 125µ, the typical cladding diameter of a single mode fiber. The diameter of the opening 59 is 250µ to snugly accommodate the two fiber sections 52 and 53. Similarly the cross-sectional diameter of the opening 58 in the sleeve 54 is 125µ to accommodate the untapered end section 51.

The long-pass filter 44 has a cutoff wavelength, i.e., a wavelength above which the filter 44 passes light through and below which the filter reflects the light back. In the application here, the filter 44 has a cut-off wavelength which is shorter than the light signals on the fibers 15 and 16 which carry network messages. Light signals from the fiber section 51 are collimated by the GRIN lens 55. After passing through the long-pass filter 44, the collimated light signals are refocussed by the second GRIN lens 56 at the end of the fiber section 53. Likewise, light from either fiber 52 or 53 is collimated by the second GRIN lens 56. The collimated light which is not reflected by the long-pass filter 44 is recollimated or focused at the end of the fiber section by the first GRIN lens 55. Assuming that light signals of wavelength λ travel on the fiber section 52, the light signals are either reflected back into the fiber section 53 or pass through to the fiber section 51 as explained above, depending upon whether λ is less or greater than the cutoff wavelength of the filter 44. The ends of the two fibers 52 and 53 are arranged with respect to the longitudinal axis of the GRIN lens 56 so that light from the fiber section 52(53) which is reflected back by the filter 44 is refocussed by the GRIN lens 56 at the end of the fiber section 53(52). The reflection relationship is reciprocal between the two fiber section 52 and 53.

Figure 4:
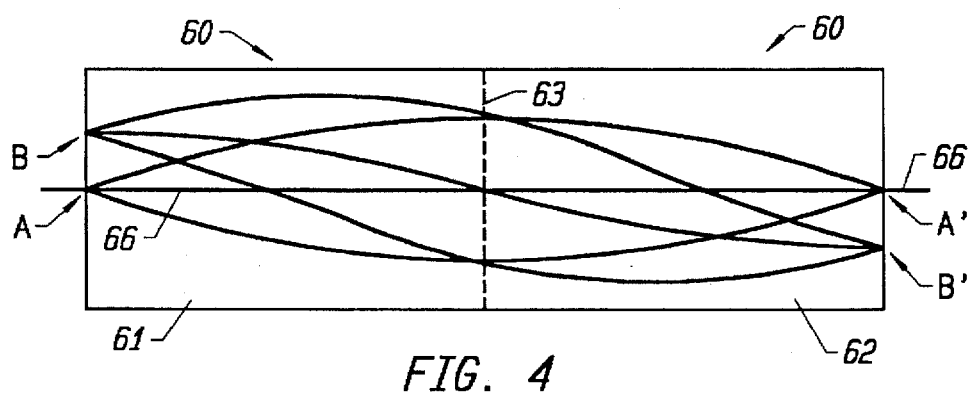
FIG. 4 is a representational illustration of the operation of one half-pitch GRIN lens, or two quarter-pitch GRIN lenses, upon the light signals between the fiber sections of the coupler of FIG. 2.

Functionally, the two quarter-pitch GRIN lenses 55 and 56 may be considered as a half-pitch GRIN lens which has been split into two equal parts. FIG. 4 illustrates the action of a half-pitch GRIN lens 60. A dotted line 63 illustrates where the half-pitch GRIN lens 60 might be separated into two quarter-pitch GRIN lenses 61 and 62. The GRIN lens 60 has a longitudinal axis 66. A point source of light A at one surface of the lens 60 on the axis 66 appears as a point A' at the other surface of the lens 60 on the axis 66. This is shown by a tracing of rays from point A to point A'. A point B at one surface of the lens 60 but slightly off the longitudinal axis 66 appears as a point B' at the other surface of the lens 60 equally removed from, but on the other side of, the longitudinal axis 66.

The detailed operation of the WDM coupler is understood as follows: The ends of the input fibers 52 and 53 are arranged with respect to one end surface of the GRIN lens 56 so that the end of each fiber section, specifically the fiber core, is slightly removed from the longitudinal axis of GRIN lens 56. As explained above, two quarter-pitch GRIN lenses operationally form one half-pitch GRIN lens. Thus the light from the fiber section 52, say, in travelling through the quarter-pitch GRIN lens 56 and being reflected back by the long-pass filter 44 through the GRIN lens 56 again pass though, in effect, a half-pitch GRIN lens. Since the light emanates from the end of the fiber section 52 which is slightly displaced from the longitudinal axis of the lens 56, the reflected light is refocussed at the end of the fiber section 53 which is slightly displaced in the opposite direction from the longitudinal axis. By symmetry, it is easy to see that light from the fiber 53 which is reflected by the filter 44 is refocussed at the end of the fiber section 52. Light which does pass through the filter 44 is refocussed by the first quarter-pitch GRIN lens 55 at the end of the fiber section 51. In this case, the two quarter-pitch GRIN lenses 56 and 55 act as a half-pitch GRIN lens.

Fiber amplifiers are optical fibers doped with certain rare-earth elements, such as erbium and praseodymium. In the present invention, an erbium-doped fiber is considered optimum for the rare-earth doped fiber 13. The network signals are in a wavelength range around 1550 nm and a pumping laser having an output wavelength range about 980 nm is used for the pumping laser 12. Thus the cut-off wavelength of the long-pass filter 60 lies in a range between 1550 nm and 980 nm. Light energy from the laser 12 though the fiber section 52 is reflected by the filter 44 through the fiber section 53. The fiber amplifier 13 is energized by the pumping laser 12 to amplify the light signals passing between the optical fibers 15 and 16.

The long-pass filter 44, typically a dichroic mirror filter plate, is attached to the flat front of the quarter-pitch GRIN lens 56, as shown in FIG. 2. Alternatively, dichroic filter material can be deposited directly onto the GRIN lens surface and an anti-reflection coating is deposited on the exposed face of the filter 44. The filter 44 can also be mounted separately from the GRIN lens 56, and both surfaces of the filter 44 are coated with anti-reflection material. This separate mounting is considered less desirable due to the simplicity of the previous alternatives.

It should be noted that the explanation above of the positions of the end sections with respect to the longitudinal axis, as called for by the theoretical operation of the GRIN lens, is an idealization. Empirically, it has been found that fine adjustments may still be required to achieve maximum performance of the WDM coupler.

More details on the WDM coupler, its variations and applications are described in U.S. Appln. No. 08/470,815, entitled "INTEGRABLE FIBEROPTIC COUPLER AND RESULTING DEVICES AND SYSTEMS," filed Jun. 6, 1995 and assigned to the present assignee.

Figure 5:
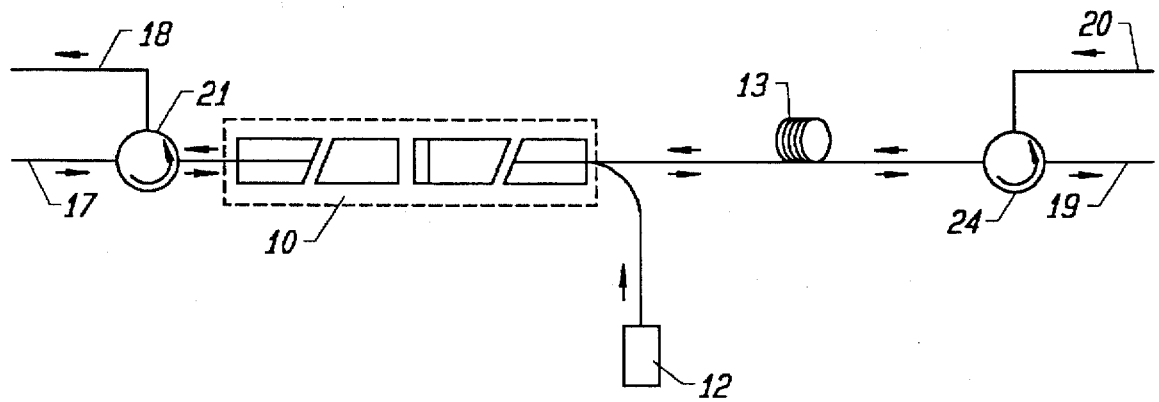
FIG. 5 is a diagram of a variation of the bidirectional fiber amplifier of FIG. 1.

A variation of the bidirectional fiber amplifier assembly of FIG. 1 is illustrated in FIG. 5. The optical circulators 11 and 14 are replaced by 3-port optical circulators 21 and 24. Instead of sending signals back on the optical fiber 17, signals in the reverse direction from the coupler 10 are transmitted to the third port which is connected to the optical fiber 18. The message signals in different directions travel on separate optical fibers. Likewise, message signals from the fiber 17 are transmitted to the optical fiber 19. Incoming signals to the optical coupler 24 from the network are transmitted in the reverse direction on a separate fiber 20. In other respects, the fiber amplifier assembly of FIG. 5 operates the same as the assembly in FIG. 1. The assembly is bidirectional and the message signals are amplified in both directions by the rare-earth doped fiber 13, though the network to which the fiber amplifier assembly is adapted, is unidirectional.

Figure 6:
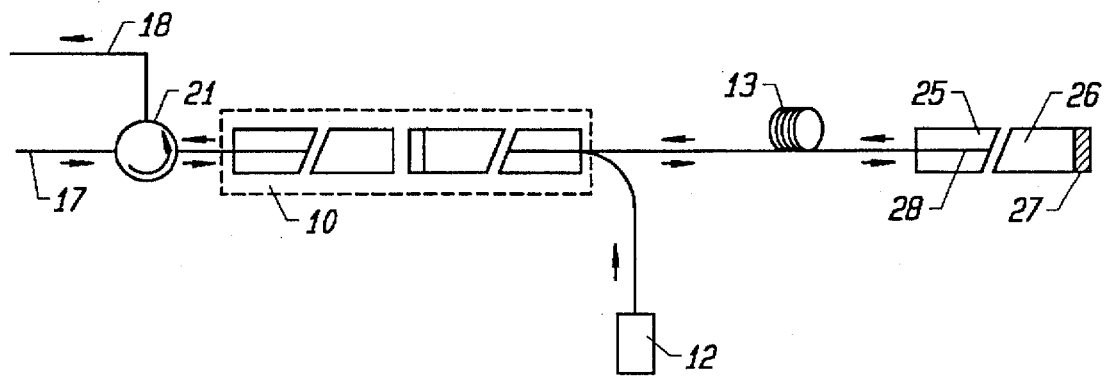
FIG. 6 is a diagram of a double-pass fiber amplifier assembly according to another embodiment of the present invention.

FIG. 6 illustrates a double-pass fiber amplifier assembly according to another embodiment of the present invention, which is suitable for unidirectional networks. The assembly has the 3-port optical circulator 21, which has its first port connected to the optical fiber 17 and its third port connected to the fiber 18. The second port of the optical circulator 13 is connected to the first fiber section of the coupler 10. The coupler 10 has its second and third fiber sections connected respectively to the pumping laser 12 and the fiber amplifier 13, as described previously. Instead of an optical circulator, however, the second end of the rare-earth doped fiber is connected to a glass sleeve 25 with an opening 28 along the longitudinal axis of the sleeve. In a manner similar to that described for the coupler 10, an end section of an optical fiber is placed in the opening 28. The end of the glass sleeve 25 facing a GRIN lens 26, is slab polished at an angle, along with the end of the fiber. The end of the GRIN lens 26 facing the glass sleeve 25 is angled reciprocally with respect to the polished face of the sleeve 25. A high reflection coating is deposited at the other end of the GRIN lens 26. The reflection coating 27 reflects all light back into the GRIN lens 26.

The message signals from the network entering the fiber amplifier assembly are amplified twice by the rare-earth doped fiber 13 before being returned back into the network along the optical fiber 18. That is, the incoming message signals entering the first port of the optical circulator 21 are transmitted into the second port and into the coupler 10. The signals travel through the coupler 10 to the fiber 13. The rare-earth doped fiber 13 is being pumped by the light energy from the pumping laser 12, as described above. The amplified signals leave the doped fiber 13 and enter the fiber being held by the sleeve 25. These signals are collimated by the GRIN lens 26 but are reflected by the coating 27. The quarter pitch GRIN lens 26 then refocuses the reflected and amplified signals back into the fiber being held in the opening 28 of the sleeve 25. The signals then pass through the rare-earth doped fiber 13 again and are amplified once more before entering the coupler 10. The signals pass through the coupler 10 into the second port of the optical circulator 21 which transmits these signals to the third port and fiber 18.

The double-pass arrangement described above (and those below) appears to have certain advantages over assemblies in which the message signals pass only once through the fiber amplifier. There is, of course, higher gain and cost effectiveness due to the higher gain. There is also better even-order nonlinearity, a slightly higher saturation level (higher gain compression), and a lower noise figure for the message signals.

Figure 7:
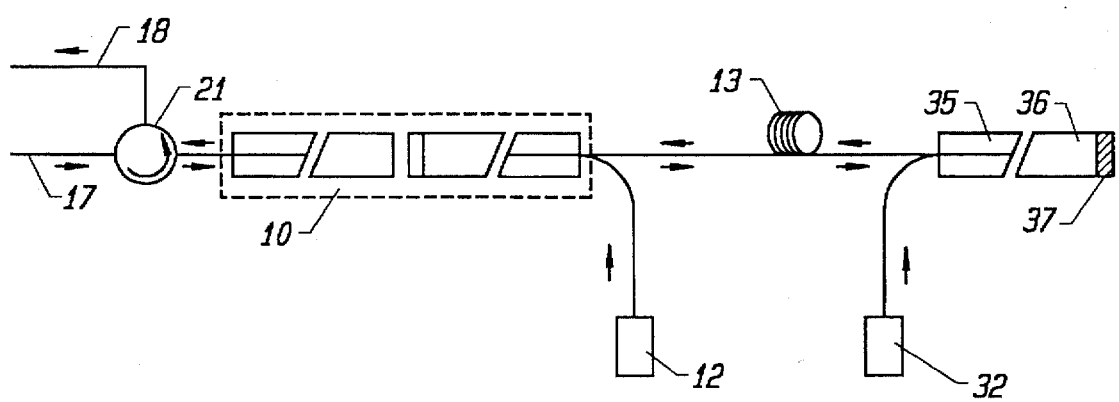
FIG. 7 is a diagram of a double-pass, double-pumped fiber amplifier assembly according to another embodiment of the present invention.

FIG. 7 illustrates a variation of the double-pass fiber amplifier assembly of FIG. 6. In place of the sleeve 25, a sleeve 35 which holds two fiber end sections like that of sleeve 57 of the coupler 10 (see FIG. 2). One fiber section is connected to the second end of the fiber amplifier 13 and the other fiber section is connected to a second pumping laser 32. In a manner as described with respect to the coupler 10, the light output from the laser 32 is collimated by a quarter pitch GRIN lens 36 and reflected by a high reflection coating 37. The reflected light is then refocused by the GRIN lens 36 into the second end of the rare-earth doped fiber 13. Light from the first fiber section and the doped fiber 13 is collimated by the GRIN lens 36, reflected by the coating 37 and refocused back into the same fiber section. Thus, the rare-earth doped fiber 13 receives pumping energy from both lasers 12 and 32. Thus, input signals from the fiber 17 pass twice through the doped fiber 13, which is being pumped doubly by the laser 12 and the laser 32. The gain of the outgoing signal on the fiber 18 is much higher than for the fiber amplifier assembly illustrated in FIG. 6.

Figure 8:
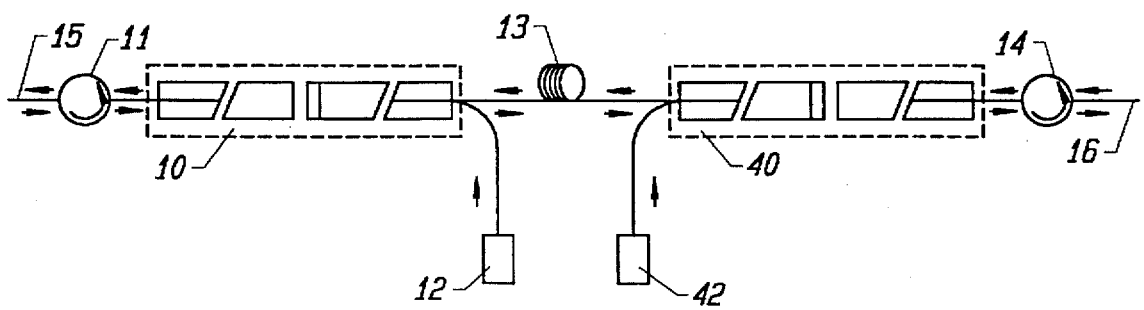
FIG. 8 is a diagram of a double-pumped, bidirectional fiber amplifier assembly according to still another embodiment of the present invention.

FIG. 8 illustrates a bidirectional, double-pumped fiber amplifier assembly. In this case, another coupler 40, like that of coupler 10, is connected to the second end of the rare-earth doped fiber 13. The first fiber section is connected to the second port of the 2-port optical circulator 14, the second fiber section is connected to a second pumping laser 42, and the third fiber section of the coupler 40 is connected to the second end of the doped fiber 13. From the symmetrical arrangement of the fiber amplifier assembly, it is readily evident that the rare-earth doped fiber 13 is pumped by both lasers 12 and 42. Furthermore, incoming signals on the fiber 15 are transmitted through the coupler 10, the doped fiber 13, the coupler 40 and the optical circulator 14 and onto the fiber 16. In a similar fashion, signals in the reverse direction on the fiber 16 are passed from the optical circulator 14, the coupler 40, the doped fiber 13, the coupler 10, and the optical circulator 11, before being passed onto the fiber 15. Signals in both directions are amplified with a double gain from the pumping lasers 12 and 42.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. An optical fiber amplifier assembly comprising a first optical circulator having a first port receiving input signals and a second port, said first optical circulator transmitting input signals to said second port;

a pumping laser generating light at a wavelength different from those of said input signals;

a rare-earth doped fiber;

a first coupler having a first fiber connected directly to said second port of said first optical circulator, a second fiber connected to said pumping laser and a third fiber connected to said rare-earth doped fiber, said coupler blocking said pumping laser light from said first fiber and reflecting said light to said third fiber, said coupler further transmitting said input signals from said first fiber to said third fiber;

whereby said rare-earth doped fiber amplifies said input signals from energy of said pumping laser light.

2. An optical fiber amplifier assembly comprising a first optical circulator having a first port receiving input signals and a second port, said first optical circulator transmitting input signals to said second port;

a pumping laser generating light at a wavelength different from those of said input signals;

a rare-earth doped fiber;

a first coupler having a first fiber connected to said second port of said first optical circulator, a second fiber connected to said pumping laser and a third fiber connected to said rare-earth doped fiber, said coupler blocking said pumping laser light from said first fiber and reflecting said light to said third fiber, said coupler further transmitting said input signals from said first fiber to said third fiber, said first coupler also comprising:

a first sleeve having an end face, a longitudinal axis and an aperture parallel to said longitudinal axis and through said end face, said aperture holding an end of said first optical fiber;

a second sleeve having an end face, a longitudinal axis and an aperture parallel to said longitudinal axis and through said end face, said aperture holding end sections of said second and third optical fibers, said second sleeve end face facing said first sleeve end face;

a first collimating lens in front of said first sleeve end face for collimating light from said first optical fiber toward at least said end of said third optical fiber;

a second collimating lens having a first end face in front of said second sleeve end face for collimating light from said second and third optical fibers toward said end of said first fiber, said second collimating lens having a second end face; and a long-pass filter in close proximity with said second end face of said second collimating lens, said long-pass filter, said second collimating lens longitudinal axis and said ends of said second and third optical fibers arranged respect to each other so that light from said second fiber and reflected by said long-pass filter passes into said third fiber, and light from said third fiber and passed by said long-pass filter leaves said long-pass filter and enters said first collimating lens as collimated light;

whereby said rare-earth doped fiber amplifies said input signals from energy of said pumping laser light.

3. The optical fiber amplifier assembly of claim 2 wherein said first and second collimating lenses each comprise quarter-pitch GRIN lens.

4. The optical fiber amplifier assembly of claim 3 wherein said long-pass filter comprises a dichroic mirror filter.

5. The optical fiber amplifier assembly of claim 1 wherein said rare-earth doped fiber has first and second ends, said first end connected to said third fiber of said coupler;

said optical fiber amplifier assembly further comprising a second optical circulator having first and second ports, said second optical circulator transmitting signals from said first port to said second port, said first port connected to said second end of said rare-earth doped fiber so that said input signals from said first port of said first optical circulator are received through said first port of said second optical circulator and transmitted from said second port of said second optical circulator.

6. The optical fiber amplifier assembly of claim 5 wherein signals from said second port of said second optical circulator are received through said second port of said first optical circulator and transmitted from first port of said first optical circulator so that said optical fiber amplifier assembly is bidirectional.

7. The optical fiber amplifier assembly of claim 5 wherein said first and second optical circulators each have third ports, said first and second optical circulators transmitting signals from said second port to said third port and signals from said third port to said first port whereby signals from said third port of said second optical circulator are received through said second port of said first optical circulator and transmitted from third port of said first optical circulator so that said optical fiber amplifier assembly operates bidirectionally.

8. An optical fiber amplifier assembly comprising:

a first optical circulator having a first port receiving input signals and a second port, said first optical circulator transmitting input signals to said second port;

a pumping laser generating light at a wavelength different from those of said input signals;

rare-earth doped fiber having first and second ends, said first end connected to said third fiber of said first coupler;

a first coupler having a first fiber connected to said second port of said first optical circulator, a second fiber connected to said pumping laser and a third fiber connected to said rare-earth doped fiber, said coupler blocking said pumping laser light from said first fiber and reflecting said light to said third fiber, said coupler further transmitting said input signals from said first fiber to said third fiber; and a second coupler, said second coupler having a first fiber, said first fiber connected to said second end of said rare-earth fiber amplifier, said second coupler reflecting input signals from said first fiber back through said rare-earth doped fiber so that said input signals are amplified by said rare-earth doped fiber twice;

whereby said rare-earth doped fiber amplifies said input signals from energy of said pumping laser light.

9. The optical fiber amplifier assembly of claim 8 wherein said first optical circulator has a third port, said first circulator transmitting signals from said second port to said third port whereby signals received through said second port of said first optical circulator is transmitted from third port of said first optical circulator.

10. The optical fiber amplifier assembly of claim 8 wherein said second coupler comprises a first sleeve having an end face, a longitudinal axis and an aperture parallel to said longitudinal axis and through said end face, said aperture holding an end of said first optical fiber;

a first collimating lens in front of said first sleeve end face for collimating light from said first optical fiber said first collimating lens having a first end face in close proximity with said first sleeve end face; and a long-pass filter in close proximity with said second end face of said first collimating lens, said long-pass filter, said first collimating lens longitudinal axis and said end of said first optical fiber arranged with respect to each other so that light from said first fiber is reflected back by said long-pass filter into said first fiber.

11. The optical fiber amplifier assembly of claim 10 wherein said long-pass filter of said second coupler comprises a dichroic mirror filter.

12. An optical fiber amplifier assembly comprising:

a first optical circulator having a first port receiving input signals and a second port, said first optical circulator transmitting input signals to said second port;

a pumping laser generating light at a wavelength different from those of said input signals;

a rare-earth doped fiber having first and second ends, said first end connected to said third fiber of said first coupler;

a first coupler having a first fiber connected to said second port of said first optical circulator, a second fiber connected to said pumping laser and a third fiber connected to said rare-earth doped fiber, said coupler blocking said pumping laser light from said first fiber and reflecting said light to said third fiber, said coupler further transmitting said input signals from said first fiber to said third fiber;

a second pumping laser generating light at a wavelength different from those of said input signals; and a second coupler having first and second fibers, said first fiber connected to said second end of said rare-earth doped fiber, said second fiber connected to said second pumping laser, said coupler reflecting said light from said second pumping laser to said first fiber of said second coupler, and reflecting input signals from said first fiber back through said first fiber to said rare-earth doped fiber so that said rare-earth doped fiber amplifies said input signals from light energy of said first and second pumping lasers and said input signals are amplified by said rare-earth doped fiber twice;

whereby said rare-earth doped fiber amplifies said input signals from energy of said pumping laser light.

13. The optical fiber amplifier assembly of claim 12 wherein said first optical circulator has a third port, said first circulator transmitting signals from said second port to said third port whereby signals received through said second port of said first optical circulator is transmitted from third port of said first optical circulator.

14. The optical fiber amplifier assembly of claim 12 wherein said second coupler comprises a first sleeve having an end face, a longitudinal axis and an aperture parallel to said longitudinal axis and through said end face, said aperture holding an end of said first optical fiber;

a first collimating lens in front of said first sleeve end face for collimating light from said first optical fiber said first collimating lens having a first end face in close proximity with said first sleeve end face; and a long-pass filter in close proximity with said second end face of said first collimating lens, said long-pass filter, said first collimating lens longitudinal axis and said end of said first optical fiber arranged with respect to each other so that said second pumping laser light from second fiber is reflected into said first fiber and light from said first fiber is reflected back by said long-pass filter into said first fiber.

15. The optical fiber amplifier assembly of claim 14 wherein said long-pass filter of said second coupler comprises a dichroic mirror filter.

16. An optical fiber amplifier assembly comprising:

a first optical circulator having a first port receiving input signals and a second port, said first optical circulator transmitting input signals to said second port;

a pumping laser generating light at a wavelength different from those of said input signals;

a rare-earth doped fiber having first and second ends, said first end connected to said third fiber of said first coupler;

a first coupler having a first fiber connected to said second port of said first optical circulator, a second fiber connected to said pumping laser and a third fiber connected to said rare-earth doped fiber, said coupler blocking said pumping laser light from said first fiber and reflecting said light to said third fiber, said coupler further transmitting said input signals from said first fiber to said third fiber;

a second optical circulator having first and second ports, said second optical circulator transmitting signals from said second port to said first port;

a second pumping laser generating light at a wavelength different from those of said input signals; and a second coupler, said second coupler having first, second and third fibers, said third fiber connected to said second end of said rare-earth doped fiber, said second fiber connected to said second pumping laser, said third fiber connected to said second port of said second optical circulator, said coupler reflecting said light from said second pumping laser to said first fiber of said second coupler, and passing input signals from said rare-earth fiber amplifier through said third fiber to said first fiber so that said rare-earth doped fiber amplifies said input signals from light energy of said first and second pumping lasers as said input signals pass from said first port of said first optical circulator to said first port of said second optical circulator;

whereby said rare-earth doped fiber amplifies said input signals from energy of said pumping laser light.

17. The optical fiber amplifier assembly of claim 16 wherein said first and second optical circulators each have a third port, said first and second circulators transmitting signals from said second port to said third port, and from said third port to said first port respectively whereby signals pass from said third port of said second optical circulator to said first port of said first optical circulator so that said optical fiber amplifier assembly operates bidirectionally.

18. The optical fiber amplifier assembly of claim 16 wherein said first and second optical circulators each transmit signals from its second port to its first port whereby signals pass from said second port of said second optical circulator to said first port of said first optical circulator so that said optical fiber amplifier assembly operates bidirectionally.

19. The optical fiber amplifier assembly of claim 16 wherein said second coupler comprises a first sleeve having an end face, a longitudinal axis and an aperture parallel to said longitudinal axis and through said end face, said aperture holding an end of said first optical fiber;

a second sleeve having an end face, a longitudinal axis and an aperture parallel to said longitudinal axis and through said end face, said aperture holding end sections of said second and third optical fibers, said second sleeve end face facing said first sleeve end face;

a first collimating lens in front of said first sleeve end face for collimating light from said first optical fiber toward at least said end of said third optical fiber;

a second collimating lens having a first end face in front of said second sleeve end face for collimating light from said second and third optical fibers toward said end of said first fiber, said second collimating lens having a second end face; and a long-pass filter in close proximity with said second end face of said second collimating lens, said long-pass filter, said second collimating lens longitudinal axis and said ends of said second and third optical fibers arranged respect to each other so that light from said second fiber and reflected by said long-pass filter passes into said third fiber, and light from said third fiber and passed by said long-pass filter leaves said long-pass filter and enters said first collimating lens as collimated light.

20. The optical fiber amplifier assembly of claim 19 wherein said first and second collimating lenses of said second coupler, each comprise quarter-pitch GRIN lens.

21. The optical fiber amplifier assembly of claim 20 wherein said long-pass filter comprises a dichroic mirror filter.

22. The optical fiber amplifier assembly of claim 1 wherein said first optical circulator has only two ports.

23. The optical fiber amplifier assembly of claim 5 wherein said first port of said second optical circulator is connected directly to said second end of said rare-earth doped fiber.

\* \* \* \* \*